United States Patent Office 3,333,400
Patented Aug. 1, 1967

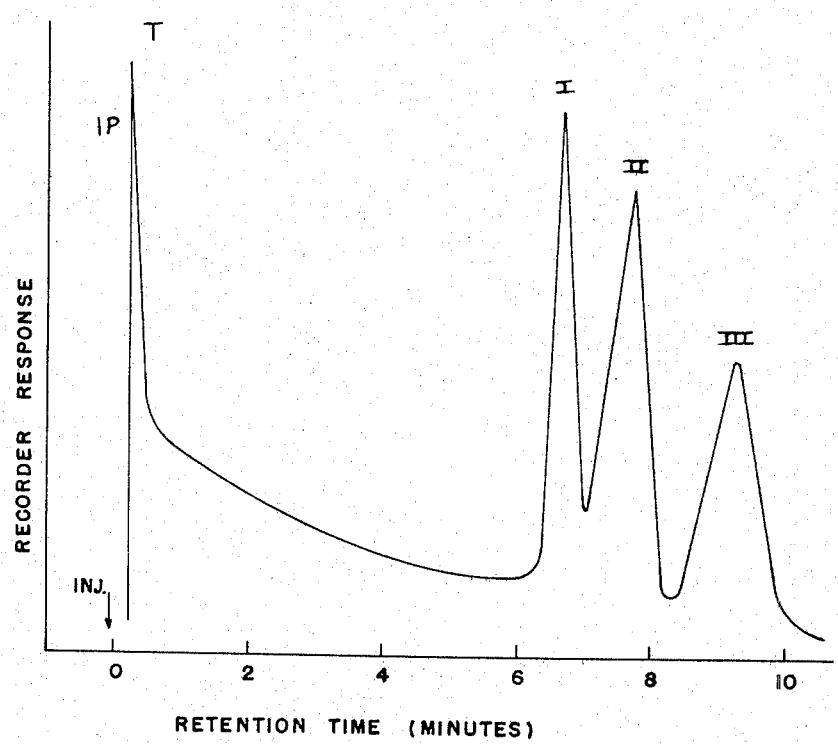

3,333,400
GAS CHROMATOGRAPHY METHOD FOR SEPARATION AND IDENTIFICATION OF ORGANIC COMPOUNDS
Sigmund Berk, Philadelphia, Pa., assignor to the United States of America as represented by the Secretary of the Army
Filed June 2, 1965, Ser. No. 460,878
1 Claim. (Cl. 55—67)

ABSTRACT OF THE DISCLOSURE

Process for separating and identifying isomeric bithienyls, specifically 2,2', 2,3', and 3,3' in concentrations as low as about $3 \times 10^{-8}$ grams by vapor phase chromatography employing suitable substrate materials.

---

The invention described herein may be manufactured and used by or for the Government for govermental purposes without the payment to me of any royalty thereon.

This invention relates to chromatography and more particularly concerns methods for the separation and identification of isomeric compounds.

Gas liquid chromatography is a relatively new field and already recognized as an outstanding technique for high resolution separation of volatile materials. In recent years much gas chromatographic developmental work has taken place, particularly in the field of instrumentation with the object of making this method of analysis more available to the industrial plant as well as to the research laboratory.

In gas chromatography one always desires good separation and obviously the proper choice of liquid phase plays a vital role. The liquid phase and the solute have an interaction which determines how long the solute will stay in the column, or stated differently, how long the retention time will be.

Prior investigators separating and identifying solutes such as isomeric bithienyls and polythienyls, for example, found their procedures to be time-consuming and insensitive to low concentrations of the isomers. Although bithienyls have been separated from terthienyls and other polythienyls by chromatographing on alumina from solvent solutions while others have used chromatography on basic alumina together with ultra-violet and infra-red absorption bands and mass spectral analysis, none of the procedures combined speed, sensitivity and economy to efficiently separate and identify isomeric bithienyls.

In the radiation chemistry of thiophene, for example, a rapid, direct and highly sensitive method for the detection and anlysis of radiation induced isomeric bithienyls would be highly desirable since, as aforementioned, existing methods are too insensitive to low isomer concentration. The isomers involved are finding general widespread use as intermediates and present otherwise interesting chemical properties to the chemist.

It is therefore an object of this invention to provide methods for separating isomeric bithienyls.

Another object of the invention is to provide methods for separating and identifying isomeric bithienyls.

Still another object of the invention is to separate and identify isomeric bithienyls by vapor phase gas chromatographic methods which are direct, sensitive and economical.

The exact nature of this invention as well as other objects and advantages thereof will be readily apparent from consideration of the following specification.

I have found that bithienyls may readily be separated by employing a chromatograph such as the FM Model 720, made by the F. & M. Scientific Corporation, Avondale, Pa., with a flame ionization detector, such as an FM Model 1609. A six foot, ¼-inch O.D. stainless steel column was packed with about 15% by weight of Carbowax 20M, a non-volatile, solid polyethylene glycol, soluble in both water and aromatic hydrocarbons, and having a molecular weight of about 20,000, on a solid support of glass beads, or tetrafluoroethylene, or firebrick or a flux-calcined diatomite, such as Chromosorb W, made by Johns-Manville Corp., Manville, N.J., and analyzing:

| | Weight percent |
|---|---|
| Moisture | 0.3 |
| $SiO_2$ | 88.9 |
| $Al_2O_3$ | 4.0 |
| $Fe_2O_3$ | 1.6 |
| $TiO_2$ | 0.2 |
| $P_2O_5$ | 0.2 |
| $CaO$ | 0.6 |
| $MgO$ | 0.6 |
| $Na_2O.K_2O$ | 3.6 |

All of the solid support materials aforementioned may conveniently be of about 60 to 100 mesh size. The liquid or stationary phase, Carbowax 20M concentration may suitably range between about 0.1 to 30 weight percent but I prefer the range of 5 to 15 weight percent. When silicon gum rubber was used as the stationary phase, less satisfactory separation of isomers resulted.

Typical experimental conditions employed in my invention are given below:

Carrier and gas flow: helium 130 ml./min.; hydrogen 58 ml./min.; air 640 ml./min.
Injection port temperature: 260° C.
Detector temperature: 205° C.
Column temperature: 220° C.

Injections of 1 microliter of a mixture of thiophene and isopropanol solutions of the isomeric bithienyls were made. The concentration of the three bithienyls present in one microliter of isopropanol-thiophene solvent mixture is shown in Table I below:

TABLE I.—GAS CHROMATOGRAPHY OF ISOMERIC BITHIENYLS ON CARBOWAX 20M

| Bithienyl | Retention Time (min.) | Concentration ($\mu$g. in 1 $\mu$l. solvent) | |
|---|---|---|---|
| | | Used in Fig. 1 | Lowest Amount Detectable |
| 2,2'- | 6.6 | 0.96 | 0.028 |
| 2,3'- | 7.6 | 1.0 | 0.029 |
| 3,3'- | 9.2 | 0.92 | 0.027 |
| (Solvents) | | | |
| Isopropanol | 0.5 | | |
| Thiophene | 0.6 | | |

The following formulae illustrate the various isomeric bithienyls above mentioned:

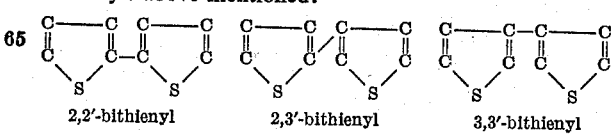

2,2'-bithienyl        2,3'-bithienyl        3,3'-bithienyl

The single figure of the drawing is a gas chromatogram of solvent solution of isometric bithienyls and indicates the excellent separation of the three isomeric bithienyls obtained with a Carbowax 20M column. The lowest amount of bithienyls detectable was approximately $3 \times 10^{-8}$ g.

The graph in the drawing was obtained using the following:

Column—15% Carbowax 20M on Chromosorb W (80–100 mesh)
Column temperature—220° C.
Injection port temperature—260° C.
Helium flow—130 ml./min.
Sample size—1.0 microliter
Attenuator setting=200×
Peak I=2,2'-bithienyl
Peak II=2,3'-bithienyl
Peak III=3,3'-bithienyl
IP=isopropanol
T=thiophene
INJ=injection point In the actual separation of the isomeric bithienyls, a preparative gas chromatograph utilizing a hot wire thermal conductivity detector is used, as is well known in the art, and is similiar to the flame ionization detector method above-mentioned but permits the separated isomeric bithienyls to be collected.

Further, it is well known that different organic compounds may yield identical retention times. In this event, infra-red analysis or other analytical procedures may be resorted to for confirmation purposes.

It is apparent from the foregoing description that I have provided methods for the rapid, sensitive and economic separation and identification of isomeric bithienyls.

I claim:

A method of separating and identifying isomeric bithienyls comprising the steps of passing an inert carrier gas containing a mixture to be separated of isomers 2,2'-bithienyl, 2,3'-bithienyl, and 3,3'-bithienyl in concentrations as low as about $3 \times 10^{-8}$ grams through a chromatographic column containing a liquid phase of a nonvolatile solid polyethylene glycol soluble in both water and aromatic hydrocarbons and having a molecular weight of about 20,000 and supported on a solid substrate selected from the group consisting of glass beads, tetrafluoroethylene, firebrick, and a flux-calcined diatomite, said solid substrate being of a mesh size between 60 to 100 mesh, and collecting each of said isomers as they emerge from said column.

References Cited

UNITED STATES PATENTS

| | | | |
|---|---|---|---|
| 3,118,947 | 1/1964 | Amir | 55—67 X |
| 3,150,516 | 9/1964 | Linnenbom et al. | 55—197 X |
| 3,257,775 | 6/1966 | Jentzsch et al. | 55—67 |

OTHER REFERENCES

Compilation of Gas Chromatographic Data, ASTM Special Technical Publication No. 343, 1963, pages 5, 8, 21, and 23.

Fischer Scientific Company Gas Chromatography Bulletin 3, "Theed as a Liquid Phase in Gas Chromatography," 1960, pages 1–11, 55–67.

Journal of Organic Chemistry, vol. 24, pages 1421–1423, 1959.

REUBEN FRIEDMAN, *Primary Examiner.*

J. L. DeCESARE, *Assistant Examiner.*